Oct. 5, 1965   C. K. BENSON ETAL   3,209,678
FOOD COOKER
Filed Jan. 5, 1962   3 Sheets-Sheet 1
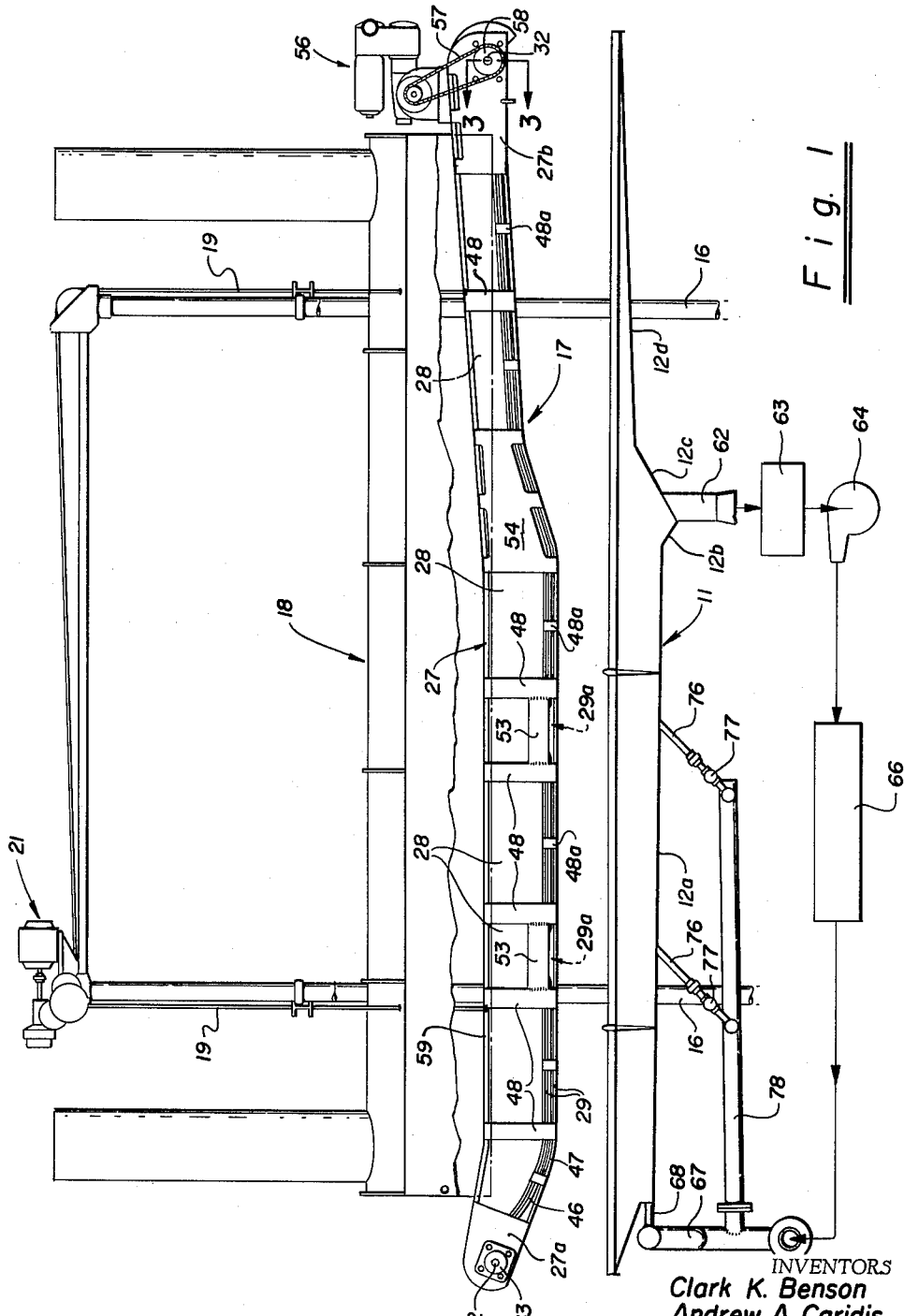
INVENTORS
Clark K. Benson
Andrew A. Caridis
BY
Attorneys

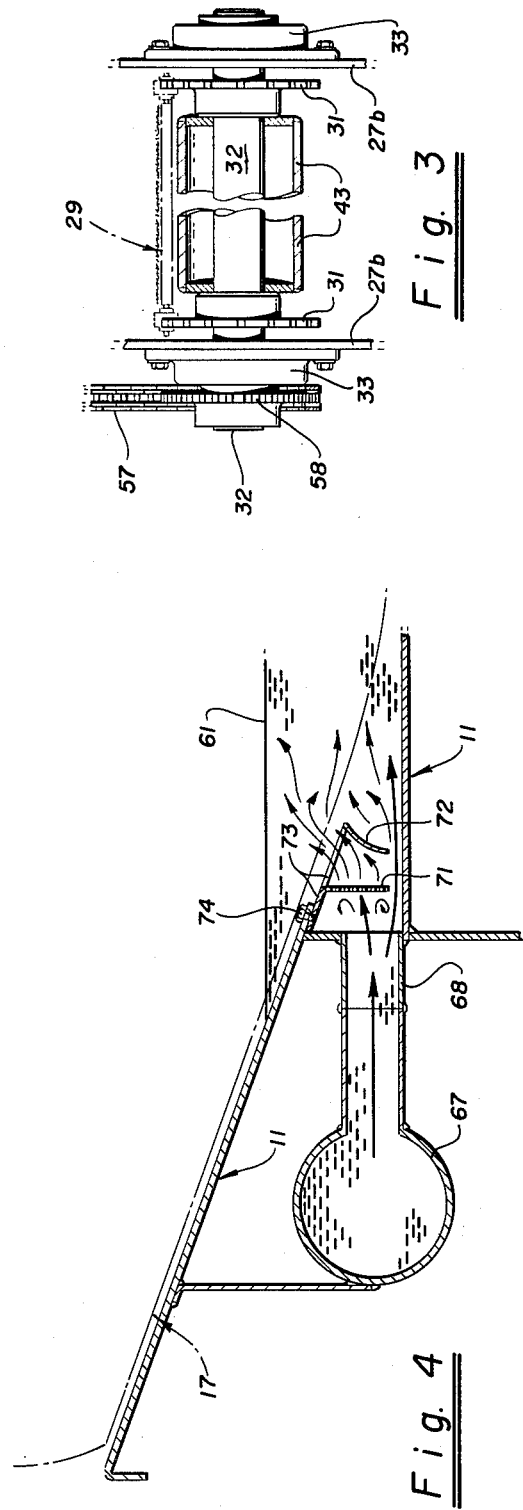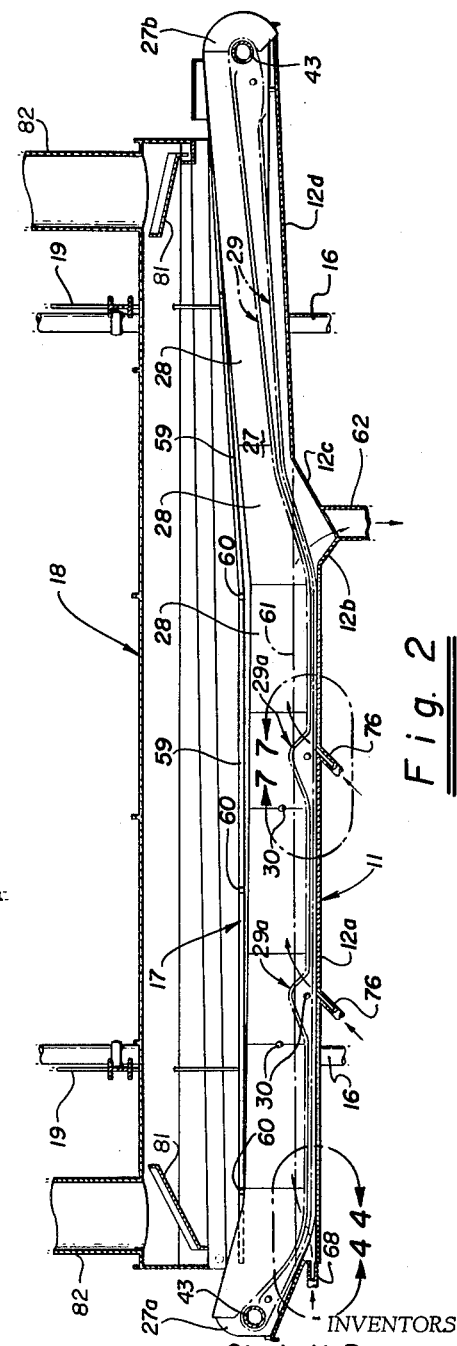

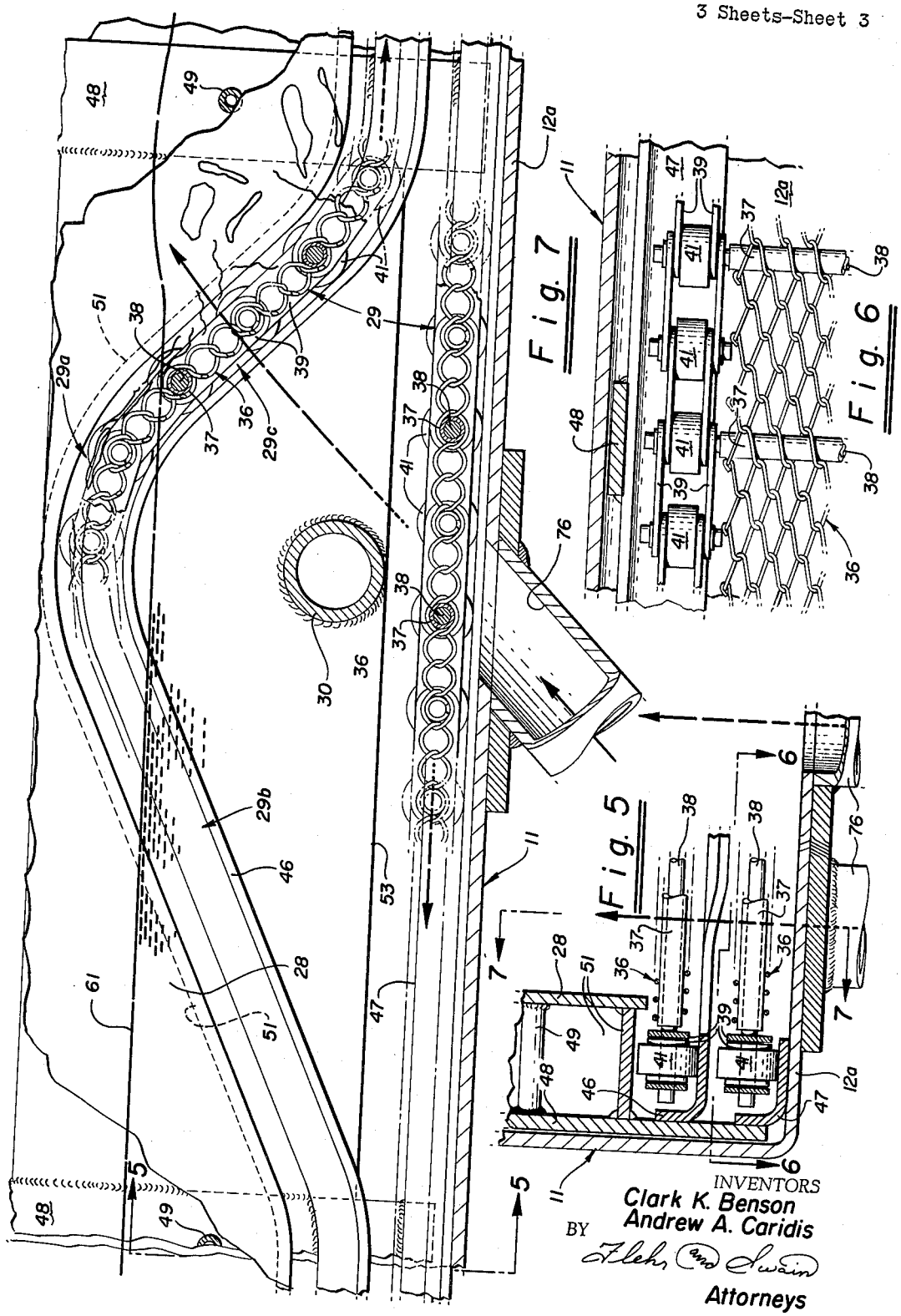

United States Patent Office 3,209,678
Patented Oct. 5, 1965

3,209,678
FOOD COOKER
Clark K. Benson and Andrew A. Caridis, Millbrae, Calif., assignors to Heat & Control, Inc., San Francisco, Calif., a corporation of California
Filed Jan. 5, 1962, Ser. No. 164,476
2 Claims. (Cl. 99—406)

This invention relates to a food cooker suitable for carrying out deep fat cooking or frying operations and more particularly to a cooker of this type utilizing continuous circulation with external heat exchanger units.

In Patent No. 2,833,203, there is described a food processing machine which is particularly adapted for carrying out deep fat cooking or frying operations. However, the food processing machine described therein is of the underfired pan type and does not utilize continuous circulation of the cooking oils with external heating of the cooking oils. Also described in Patent No. 2,833,203 are looped portions in the upper run of the conveyor belt which are looped over sprocket wheels to carry the product out of the oil and to re-distribute and separate the pieces to prevent uneven cooking or striping. It has been found that for certain food cooking operations, the pan fired type of food processing machine without continuous oil circulation has numerous disadvantages, the primary one being the amount of product which can be cooked within a cooker of a certain size. In addition, the means for looping the upper run of the conveyor in the food processing machine shown in Patent No. 2,833,203 has been found to have disadvantages. The bearings, sprockets and cross shafts utilized for providing the loops are immersed in the oil in the cooker and are rather large and cumbersome. Considerable fouling of the product occurred in the sprockets and in the conveyor utilized. In addition, with such an arrangement, a considerable quantity of oil is required in the cooker because of the diameter of the sprocket wheels. Also, the looped portions provided in Patent No. 2,833,203 required a substantial lengthening of the cooker pan which also increased the quantity of oil required in the pan. As is well known to those skilled in the art of food cooking, it is desirable to keep the volume of oil in the pan as low as possible so as to prevent the build-up of free fatty acids in the oil. There is, therefore, a need for a new and improved food cooker which overcomes the above-named disadvantages.

In general, it is an object of the present invention to provide a food cooker of the above character which is particularly adapted for continuous operation with continuous oil flow utilizing external heat exchangers.

Another object of the invention is to provide a cooker of the above character which is provided with multiple hold-back and turn-over sections to better control the product flow through the cooker.

Another object of the invention is to provide a cooker of the above character in which it is possible to utilize a high rate of oil flow while still obtaining product uniformity without striping and uneven cooking.

Another object of the invention is to provide a cooker of the above character in which oil flows at a faster rate than the conveyor belt to provide a good wiping action of the oil through the mass of product.

Another object of the invention is to provide a cooker of the above character in which the product is held back and then lifted and tumbled to re-distribute and separate the product as it passes through the cooker.

Another object of the invention is to provide a cooker of the above character in which multiple oil jets extending the full width of the cooker pan are utilized to introduce turbulence at the point of tumbling to assure further separation of the product and to eliminate any possible striping or non-uniformity in the cook.

Another object of the invention is to provide a cooker of the above character in which fouling of the product in the cooker is reduced to a minimum.

Another object of the invention is to provide a cooker of the above character in which the amount of oil required is reduced to a minimum.

Another object of the invention is to provide a cooker of the above character in which means is provided for causing all of the product to move through the cooker without the occurrence of stragglers which would have a tendency to burn or overcook.

Another object of the invention is to provide a cooker of the above character which has a very high cooking capacity per square foot of the conveyor belt area.

Another object of the invention is to provide a cooker of the above character which is relatively compact.

Additional objects and features of the invention will appear from the following description in which the preferred embodiment of the invention has been set forth in detail in conjunction with the accompanying drawings.

Referring to the drawings:

FIGURE 1 is a side elevational view of a food cooker incorporating our invention with the conveying unit and with the hood raised, and with certain of the parts schematically illustrated.

FIGURE 2 is a longitudinal cross-sectional view of the food cooker shown in FIGURE 1 with the conveying unit and the hood in their normal position during a cooking operation.

FIGURE 3 is an enlarged cross-sectional view taken along the lines 3—3 of FIGURE 1.

FIGURE 4 is an enlarged detail view of a portion of of the cooker encircled by the line 4—4 of FIGURE 2.

FIGURE 5 is a cross-sectional view taken along the line 5—5 of FIGURE 7.

FIGURE 6 is an enlarged detail view taken along the line 6—6 of FIGURE 5.

FIGURE 7 is an enlarged detail view of the portion encircled by line 7—7 of FIGURE 2.

In general, our food cooker consists of a cooker pan which is adapted to hold a quantity of oil. Means is provided in the cooker pan for projecting objects to be cooked through the oil which consists of an endless conveyor having upper and lower runs. Means is provided for causing at least one portion of the upper run of the conveyor to be looped intermediate the end portions of the conveyor for holding back the product and then elevating the product and tumbling it to affect separation and re-distribution of the product. Means is also provided for introducing jets of cooking oil into the product as it is being tumbled to further separate and re-distribute the product to eliminate possible striping and non-uniformity of cook.

Referring to the drawings, it can be seen that our food cooker consists of a cooker pan 11 which is relatively shallow and elongate as shown. It is provided with a relatively horizontal bottom wall portion 12a, a downwardly inclined bottom wall portion 12b, an upwardly inclined portion 12c and an upwardly inclined bottom wall portion 12d as shown particularly in FIGURES 1 and 2.

The pan 11 is supported by a pair of vertical standards or posts 16 which are provided on each side of the pan. A conveyor assembly 17 and a hood assembly 18 are secured by cables 19 to an electrically operated hoist 21 which is mounted on the vertical standard 16. As described in Patent No. 2,833,203, the arrangement is such that operation of the hoist 21 first raises the hood assembly 18 to permit inspection of the cooking operation and thereafter, if desired, further raising of the hood causes raising of the conveyor assembly 17 for inpection of the conveyor and cleaning of the cooker pan 11.

The conveyor assembly 17 consists of a frame 26 which is comprised of a pair of spaced parallel vertical side frame members 27 which serve as skirts as hereinafter described. The side frame members 27 are comprised of a plurality of elongate overlapping plates 28 which overlap in the direction of travel of the product through the cooker pan as hereinafter described to thereby prevent the product from catching on the edges of the plates. The plates are then fastened together in a suitable manner such as by welding to provide the unitary side frame members 27. The side frame members are separated by horizontal spacers 30.

A conveyor 29 is mounted between the side frame members 27. It is mounted on sprockets 31 on opposite ends of the frame 26. The sprockets 31 are affixed to head and tail shafts 32 which are rotatably mounted in bearing blocks 33. On the feed end of the food cooker, the bearing blocks 33 are carried by extensions 27a which are affixed to the side frame members 27, whereas on the discharge end of the food cooker, the bearing blocks 33 are mounted on extensions 27b provided on the other ends of the side frame members 27.

The conveyor belt 29 is formed of a wire mesh belt 36 which is of a type which eliminates side creep and equalizes operating stresses. Cross sleeves 37 are threaded through the mesh as shown and receive cross rods 38 which are slidably mounted therein. The ends of the cross rods are connected by spaced pairs of links 39. Rollers 41 having a diameter which is substantially greater than the width of the links 39 are provided at each point of connection for the links 39. It will be noted that the cross rods are positioned at every other pitch of the roller chain formed by the rollers 41 and the inks 39. As shown particularly in FIGURE 3, the rollers 41 are readily accommodated by the sprockets 31 mounted at the opposite ends of the conveyor frame 36. Drums 43 are mounted on the head and tail shafts 32 and have a diameter which is slightly greater than the pitch of the chain to prevent bowing of the cross rods as the cross rods pass over the sprockets and thereby serve to keep the conveyor belt flat and tight as it passes over the head and tail shafts.

Means is provided on the conveyor frame 26 for guiding the upper and lower runs of the endless belt 29 in its travel between the intake and discharge ends of the food cooker. This means consists of upper and lower L-shaped guide members 46 and 47 which are maintained in a predetermined spaced relationship by vertical supporting members 48 and 48a which are secured to the side frame members 27 in a suitable manner such as by spacer pins 49. As can be seen particularly from FIGURE 5, the guides 46 and 47 are positioned so that the upper and lower runs of the conveyor belt are disposed relatively close to each other and travel in very close proximity to the bottom wall 12a of the cooker pan 11. It can be seen that the upper guide 46 also serves to limit the uppermost travel for the lower run of the conveyor. An additional elongate member 51 is mounted on the exterior of the side frame members 27 and is also supported by the vertical members 48. This serves to limit upward movement of the upper run of the conveyor belt.

As can be seen particularly from FIGURE 4, the guides for the upper and lower runs of the conveyor very closely follow the contour of the bottom wall of the cooker pan with the exception that the guides forming the upper run of the conveyor belt are shaped to provide one or more turn-over and hold-back devices between the intake and discharge ends of the upper run of the conveyor. The tracks for the upper run of the conveyor are formed so as to provide two spaced looped portions 29a in the conveyor belt. The looped portions are provided with a gradually upwardy inclined portion 29b on the product lifting side and a downwardly steeply inclined portion 29c on the product tumbling side. Additional supporting portions 53 are secured to the vertical support members 48 and to the track forming members 46 and 51 to thereby properly support the looped portions of the members 46 and 51. An additional track supporting member 54 is also mounted upon the side frame members 27 in a manner similar to the vertical supporting members 48.

Suitable means is provided for driving the conveyor belt 29 and consists of a variable speed drive unit 56 which, through a chain 57, drives a sprocket wheel 58 affixed to the tail shaft 32. It will be noted that the entire conveyor assembly is fabricated in such a manner that it can be lowered into the cooker pan 11 so that the lower run of the conveyor belt travels immediately adjacent the bottom wall of the cooker pan. Longitudinal guard rails 59 are fixed to the side frame members 27 above the side frame members and are separated by cross members 60.

Means is provided for causing a continuous flow of heated cooking oil in the cooker pan so that an oil level indicated by the line 61 shown in FIGURE 2 is maintained in the cooker pan. This means consists of a drain pipe 62 through which oil is removed from the cooker pan. Thereafter, the oil passes into the catch box 63 of a type described in copending application Serial No. 84,226, filed January 23, 1961, entitled "Catch Box." The catch box serves to remove fines from the oil. Thereafter, the oil is supplied to a pump 64 of the centrifugal type which delivers the oil to a heat exchanger 66. The oil from the heat exchanger is supplied to an intake manifold 67.

The intake manifold 67 is provided with a plurality of horizontal pipes 68 which enter the intake end of the cooker pan 11 as shown in FIGURES 1 and 4. The horizontal pipes 68 are spaced in a suitable manner across the entire width of the pan 11. Thus, for example, twelve separate pipes 68 evenly spaced across the width of the pan can be provided. These pipes 68 introduce jets of oil which are substantially parallel to the bottom wall of the pan. Immediately forward of the jets of oil, there is provided a perforated baffle plate 71 which is substantially vertical as shown. The baffle plate breaks up the jets of oil to provide a more or less uniform forward flow of the oil from that point on in the cooker pan. Immediately forward of the perforated baffle plate 71, there is provided a forwardly and upwardly curved baffle plate 72 which is encountered by the forwardly flowing stream of oil in the pan which serves to lift a substantial portion of the forwardly flowing oil upwardly so that a relatively fast moving stream of oil extending across the width of the pan is provided adjacent the top surface of the oil in the pan. The perforated plate 71 and the baffle 72 are secured to a bracket 73 which is affixed to a portion of the pan 11 by the cap screws 74.

Additional means is provided to ensure that the product as it is tumbled by the looped portions 29a provided on the conveyor belt are adequately tumbled and re-distributed and consists of a plurality of jets of oil which are introduced into the product as it tumbles as shown particularly in FIGURE 7. These jets of oil are supplied by a plurality of pipes 76 spaced across the width of the pan which enter the bottom wall 12 of the pan 11 at an angle so that the oil discharging therefrom is discharged upwardly at an angle as shown by the arrow in FIGURE 7. For example, six pipes 76 equally spaced across the width of the pan can be provided for each looped portion 29a of the conveyor belt. The flow through the pipes 76 can be controlled by valves 77. Oil is supplied to the pipes 76 by a large supply pipe 78 which is connected to the intake manifold 67.

A condensate drip pan 81 is provided on opposite ends of the hood 18 below the vent pipes 82 to collect condensate dripping from the vent pipes to thereby prevent the condensate from falling into the cooking oil.

Operation and use of our food cooker may now be briefly described as follows. Let it be assumed that a uniformly cut product such as raw French fried potatoes are introduced into the intake end (left end as viewed in FIGURE 2) of our food cooker. As the product is introduced, the product is carried forward by the upper run of the conveyor belt 29. As the product enters the hot cooking oil, the product is urged forwardly by the relatively rapidly forwardly moving stream of oil which is urged toward the top surface of the oil by the curved baffle 72. Initially, the product will tend to accumulate in the oil in the space or zone provided between the intake end and the first looped portion 29a of the upper run of the conveyor belt. As soon as this zone or portion is filled with product, the product is carried upwardly by the inclined portion 29b of the upper run of the conveyor and is actually lifted out of the cooking oil for a short period of time. After the product passes over the top of the looped portion 29a, it is tumbled and re-distributed on the downwardly sloping portion 29c of the looped portion of the conveyor belt. To aid in tumbling and re-distribution of the product, the inclined jets of oil from the pipes 76 impinge upon the product and also induce additional turbulence in the oil at the point at which the product is tumbled in the oil to ensure further separation and re-distribution and to eliminate any possible striping or non-uniformity in the cook of the product. The product is then retained in the second portion or zone within the cooker until the second zone between the two looped portions is filled. Thereafter, the product is again lifted out of the oil and again tumbled and re-distributed by the second looped portion 29a provided in the conveyor belt. The product is also tumbled and re-distributed by the jets of oil provided in conjunction with the second looped portion of the upper run of the conveyor belt. Thereafter, the product continues to pass through the cooker until the third portion of the cooker is filled up. Thereafter, the product is urged onto the conveyor belt and is carried upwardly out of the oil, after which the oil drains from the product and the product is discharged from the discharge end of the conveyor. The product is then salted if required and packed in a manner well known to those skilled in the art.

From the foregoing description, it can be seen that the looped portions 29a serve as turn-over devices and that they also serve as hold-back devices. As hereinbefore explained, as the product enters the cooker, it is carried ahead by the circulating oil. Normally, it is desirable to provide an oil flow which moves faster than the conveyor belt. This provides for a good wiping action of the oil through the mass of the product and results in a high rate of heat transfer to the product. Heretofore, without the hold-back feature provided by the looped portion 29a of the upper run of the conveyor belt, it has been difficult to obtain product uniformity because in utilizing high rates of oil flow in the cooker pan, some of the product was often carried through faster than other pieces which resulted in non-uniformity of cook and in finished color. Since the looped portions 29a actually extend above the surface of the oil, the looped portions 29a serve as hold-back devices and thereby ensure that the product travels at a uniform rate through the cooker pan so that all the pieces of the product will be cooked uniformly and will have a uniform color.

It should be readily apparent that any number of looped portions can be provided in the upper run of the conveyor. It is merely necessary to provide enough of these looped portions so that the product will pass uniformly through the cooker and so that at the same time it will be properly re-distributed and tumbled so as to avoid striping or non-uniformity in the cook.

One of the primary advantages of the construction we have utilized in our cooker is that the looped portions have been provided in the upper run of the conveyor belt without the use of sprockets, shafts or bearings positioned in the oil. This has the distinct advantage in that it eliminates fouling of the product in such sprockets, shafts or bearings. The looped portions in the upper run of the conveyor belt as hereinbefore described have been formed by curved tracks provided for the roller chains carrying the wire mesh belting. It has been found that such a conveyor belt can be readily used and that a plurality of looped portions can be provided in the upper run of the cable without unduly loading the drive motor 56.

Also, it will be noted that the construction is such that the upper and lower runs of the conveyor belt are in relatively close proximity to the bottom wall of the cooker pan so as to make it possible to maintain a minimum depth of oil in the cooker pan. Thus, for example, in one embodiment of our invention, we have found that it was only necessary to provide an oil depth in the pan of approximately 3¾ to 4 inches to give a cooking depth of 2½ inches, and thus allowing only 1¾ inches for the upper and lower runs of the conveyor belt.

The product is kept clear of the guide tracks provided for the roller chain by the skirt-like side frame members 27 which, as hereinbefore explained, were formed so that they overlap in the direction of product flow to minimize the opportunity for product fouling at the lap points. The only sprockets and shafts provided in the entire conveyor assembly are provided at the opposite ends of the conveyor assembly out of the oil so as to thereby eliminate fouling of the product in the sprockets. Also, by removing the sprockets from the oil, it is possible to keep the oil depth in the cooker pan at a minimum. If the sprockets were positioned in the oil, a considerably greater depth would be required to cover the upper run of the conveyor belt because of the diameter of the sprockets.

The forward flowing stream provided at the intake end of the cooker assures that no pieces of the product will lag behind and thus become stragglers which would have a tendency to burn or overcook. This forwardly moving stream at the upper surface of the level 61 also assures that all of the product will be moved ahead at a uniform rate in the cooker pan.

The amount of oil entering the pipes 76 and entering the pipes 68 can be adjusted by the valves 77. Normally, we have found it desirable to have approximately 60% of the oil flow enter the pipes 68, whereas the other 40% of the oil flow can be introduced through the pipes 76. Normally, the oil flow is introduced in such a manner that the temperature of the oil remains substantially uniform throughout the entire length of the cooker pan. Thus, if it is desired to increase the temperature of the oil near the discharge end, additional oil would be introduced through the pipes 76.

As can be seen from the foregoing description, the design of our food cooker is such that it utilizes a minimum of oil. As is well known to those skilled in the art, the smaller the amount of oil used, the greater the amount of turn-over of oil, that is, the absorption of oil by the product in a ratio to system volume. As is also well known to those skilled in the art, this ratio should be such so that there is at least one turn-over of the cooking oil once in every eight hours so as to minimize the formation of free fatty acids.

In addition to the foregoing advantages, we have found that our food cooker cooks the product very uniformly with a uniform color throughout. Also, it is possible to obtain a very high cooking capacity per square foot of conveyor belt area. This is made possible because of the relatively rapid movement of the product through the cooker pan and also because of the rapid flow of oil through the product mass as to obtain a rapid heat transfer from the oil to the product. There is no opportunity for the product to float around or form congested pools which would lead to non-uniformity in cooking.

The cooking time can be adjusted by adjusting the speed of drive of the conveyor belt by the variable speed unit 56 or by regulating the temperature of the oil introduced into the cooker pan.

Although we have described our cooker primarily for the cooking of French fries, it is readily apparent that the food cooker can be utilized for oil blanching or frying cut or small whole potatoes. Also, it can be utilized for the cooking of fish sticks, chicken, nuts, potato by-products, toasted corn kernels, fish fillets and other similar products.

It is apparent from the foregoing that we have provided a new and improved food cooker which has many outstanding features.

We claim:

1. In a food cooker, a cooker pan adapted to hold a quantity of oil, means for advancing the product to be cooked through the oil, said means comprising an endless perforate conveyor having upper and lower runs, means for causing at least one portion of the upper run of the conveyor to be looped so as to provide a gradual incline upwardly and out of the oil and a steep incline downwardly and into the oil, and means mounted in the cooking pan for causing jets of cooking oil to project forwardly and upwardly through the looped portion of the upper run of the perforate conveyor and in a direction generally perpendicular to the downward incline of the looped portion so that the oil issuing from the jets combine with the relatively steep downward incline of the looped portion to tumble, redistribute and separate the product.

2. In a food cooker, a cooker pan adapted to hold a quantity of oil, means for heating the oil and introducing the heated oil into the cooker pan in a continuous flow, and means for advancing the product to be cooked through the oil in the cooker pan, said means for advancing the product comprising an endless conveyor having upper and lower runs traveling at a speed less than the speed of travel of the oil, and means for causing at least one portion of the upper run of the conveyor to be looped upwardly out of the oil so as to serve as hold back means to prevent the product from following the oil, said looped portion being provided with a gradually upwardly inclined portion raising the product out of the oil and steeply downwardly inclined portions to permit the product to tumble into the oil, the means for introducing a continuous flow of cooking oil including means for introducing jets of cooking oil into the oil at an area at which the product is tumbled into the oil by the looped portion of the upper run of the conveyor to thereby effect further separation and redistribution of the product to eliminate possible striping and non-uniformity in the cook of the product, the means for introducing a continuous flow of oil in the cooker pan also including an intake manifold, a plurality of pipes connected to the intake manifold to provide jets of oil entering the pan in a forward direction, a perforated baffle plate disposed in the cooker pan in front of the jets of oil from said pipes to break up the jets of oil and to provide a substantially uniform flow of oil in the cooker pan, and a forwardly and upwardly curved baffle plate disposed in the cooker pan in front of said perforated baffle plate and spaced above the bottom wall of the cooker pan and serving to direct a substantal portion of the forwardly flowing oil upwardly so that a relatively fast moving stream of oil extends across the width of the pan adjacent the top surface of the oil in the pan.

References Cited by the Examiner

UNITED STATES PATENTS

| | | | |
|---|---|---|---|
| 1,625,070 | 4/27 | Bailey | 99—405 |
| 1,674,555 | 6/28 | Leone | 99—404 |
| 1,808,215 | 6/31 | Friedel | 99—406 |
| 2,715,869 | 8/55 | Salvo | 99—404 |
| 2,833,203 | 5/58 | Benson | 99—404 |
| 3,008,404 | 11/61 | Winterfeldt | 99—406 |

FOREIGN PATENTS 166,643  7/21  Great Britain.

ROBERT E. PULFREY, *Primary Examiner.*

JOSEPH D. BEIN, JEROME SCHNALL, *Examiners.*